United States Patent [19]
Aoki et al.

[11] Patent Number: 5,931,380
[45] Date of Patent: Aug. 3, 1999

[54] HEATING APPARATUS FOR VEHICLE

[75] Inventors: Shinji Aoki, Kariya; Toshio Morikawa, Toyota; Hajime Ito, Kariya; Yasushi Kato; Goro Uchida, both of Toyota, all of Japan

[73] Assignees: Denso Corporation, Kariya; Toyota Jidosha Kabushiki Kaisha, Toyota, both of Japan

[21] Appl. No.: 08/898,536

[22] Filed: Jul. 22, 1997

[30] Foreign Application Priority Data

Jul. 22, 1996 [JP] Japan ................................ 8-192106

[51] Int. Cl.⁶ ........................................ B60H 1/02
[52] U.S. Cl. ............................. 237/12.3 B; 123/142.5 R
[58] Field of Search ................. 123/142.5 R; 122/26; 126/247; 237/12.3 B

[56] References Cited

U.S. PATENT DOCUMENTS

| | | | |
|---|---|---|---|
| 4,058,255 | 11/1977 | Linder et al. | 237/12.3 B |
| 4,733,635 | 3/1988 | Menard et al. | 237/12.3 B |
| 4,756,359 | 7/1988 | Greer | 237/12.3 B |
| 4,974,778 | 12/1990 | Bertling . | |
| 4,993,377 | 2/1991 | Itakura . | |

FOREIGN PATENT DOCUMENTS

| | | |
|---|---|---|
| 195 00476 A1 | 7/1996 | Germany . |
| A-61-181717 | 8/1986 | Japan . |
| A-6-92134 | 4/1994 | Japan . |

OTHER PUBLICATIONS

Patent Abstracts of Japan, vol. 18, No. 358, Jul. 6, 1994, 06–092134.

*Primary Examiner*—Erick R. Solis
*Attorney, Agent, or Firm*—Harness, Dickey & Pierce, PLC

[57] ABSTRACT

A viscous heater for heating cooling water for cooling a water cooled engine is disposed in a cooling water circuit, and a front heater core is disposed in the cooling water circuit at a downstream side of the viscous heater with reference to a flow direction of the cooling water. Only when a heating operation is the maximum heating operation or the maximum heating operation is desired, a viscous clutch is turned on to transmit a driving force of the engine to the viscous heater. When the maximum heating operation is not desired, the viscous clutch is turned off so that the driving force of the engine is not transmitted to the viscous heater. Therefore, a load of the engine is reduced, and the cost for running the vehicle can be lowered.

5 Claims, 8 Drawing Sheets

HEATING APPARATUS FOR VEHICLE

CROSS-REFERENCE TO RELATED APPLICATION

This application is related to and claims priority from Japanese Patent Application No. Hei. 8-192106 filed on Jul. 22, 1996, the contents of which are hereby incorporated by reference.

BACKGROUND OF THE INVENTION

1. Field of the Invention

The present invention relates to a heating apparatus for a vehicle, in which a heat-generating unit using a shearing force, for increasing a temperature of cooling water for cooling a water-cooled engine, is disposed in a cooling water circuit.

2. Description of Related Art

Conventionally, as a heating apparatus for a vehicle, a hot water type heating apparatus for heating a passenger compartment has been generally known. In the hot water type heating apparatus, cooling water for cooling a water-cooled engine is supplied to a heater core disposed in a duct, and air heated while passing through the heater core is blown into the passenger compartment by a blower to heat the passenger compartment of the vehicle.

However, in a case of a vehicle in which heat generated in the engine is too small to heat the cooling water with engine sufficiently, such as a vehicle having a diesel engine or a lean burn engine, because a temperature of cooling water in a cooling water circuit cannot be maintained at a predetermined temperature (e.g., 80° C.), there occurs a problem in that a heating capacity for the passenger compartment is insufficient.

To overcome such a problem, as disclosed in JP-A-6-92134, the following heating apparatus for a vehicle is conventionally proposed. In the heating apparatus for a vehicle, a heat-generating unit using a shearing force, for heating cooling water to be supplied to a heater core from an engine, is disposed in a cooling water circuit.

The heat-generating unit transmits a driving force of the engine to a shaft through a belt transmitting mechanism and the electromagnetic clutch. A heat-generating chamber is formed in a case of the heat-generating unit, and a cooling water passage is formed at an outer periphery of the heat-generating chamber. A rotor which rotates integrally with the shaft is disposed in the heat-generating chamber, and a shearing force generated by a rotation of the rotor is applied to viscous fluid such as silicon oil sealed in the heat-generating chamber to generate heat. The cooling water circulating in the cooling water passage is heated by the generated heat.

However, according to the above-described conventional heating apparatus for a vehicle, since the driving force (i.e., driving torque) acting in the shaft of the heat-generating unit is converted into a supplementary heating source, a large load due to the driving torque (i.e., driving load) is applied to the engine. Therefore, there is a problem in that fuel consumption rate of the engine lowers and running cost of the vehicle rises.

Further, because only the temperature of the cooling water determines whether or not the heat-generating unit is operated, an electromagnetic clutch may be turned on and the heat-generating unit may be driven when the temperature of the cooling water is less than a set temperature at warm-up operation in the summer. Thus, the viscous fluid in the heat-generating chamber generates an abnormal heat, and heat-deterioration of the viscous fluid and mechanical deterioration due to a shearing force may be generated.

To prevent the heat-generating unit from being operated excessively, the set temperature of the cooling water may be decreased so that deterioration of the fuel consumption rate can be suppressed. However, in this case, because the temperature of the cooling water to be supplied to a heater core cannot be maintained at a predetermined temperature, a radiating amount of the heater core is decreased. Therefore, there occurs a problem in that a sufficient heating capacity cannot be obtained when a passenger in the passenger compartment desires the maximum heating operation.

SUMMARY OF THE INVENTION

In view of the foregoing problems of the prior art, it is an object of the present invention to provide a heating apparatus for a vehicle, which can prevent the fuel consumption rate of the engine from being lowered as well as an abnormal heat generated in the viscous fluid, by optimizing a used condition of a heat-generating unit using a shearing force.

Further, it is another object of the present invention to provide a heating apparatus for a vehicle, which can obtain a sufficient heating capacity when a heating operation is in the maximum heating operation or the maximum heating operation is desired.

According to the present invention, a heating apparatus for a vehicle having a water-cooled engine, includes a heating heat exchanger disposed in a duct for heating a passenger compartment by heat-exchange between cooling water having cooled the engine and air to be blown into the passenger compartment, and a heat-generating unit using a shearing force. The heat-generating unit has a rotor which rotates when a driving force is applied thereto and a heat-generating chamber for sealing therein viscous fluid which generates heat for heating the cooling water to be supplied to the heating heat exchanger when a shearing force generated by a rotational force of the rotor is applied to the viscous fluid. The heat-generating unit is operated only when the heating operation of the passenger compartment is the maximum heating operation or the maximum heating operation for the passenger compartment is desired.

In this way, only when the heating operation of the passenger compartment is the maximum heating operation or the maximum heating operation for the passenger compartment is desired, a heating control unit controls a driving force transmission unit to rotate the rotor of the heat-generating unit. Therefore, cooling water to be supplied to the heating heat exchanger from the engine is sufficiently heated, and a sufficient heating capacity corresponding to the maximum heating operation can be obtained in the present invention.

On the other hand, when the maximum heating operation is not desired, the heating control unit controls the driving force transmission unit to stop a rotation of the rotor of the heat-generating unit. Therefore, a load of the engine and a load of the driving force transmission unit are reduced, a fuel consumption rate of the engine is lowered, and the cost for running the vehicle can be lowered. Thus, when the temperature of the cooling water is less than a set temperature at warm-up operation in the summer, for example, the rotor of the heat-generating unit does not rotate so that the viscous fluid in the heat-generating chamber does not generate an abnormal heat.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1–7.

Figure 1:
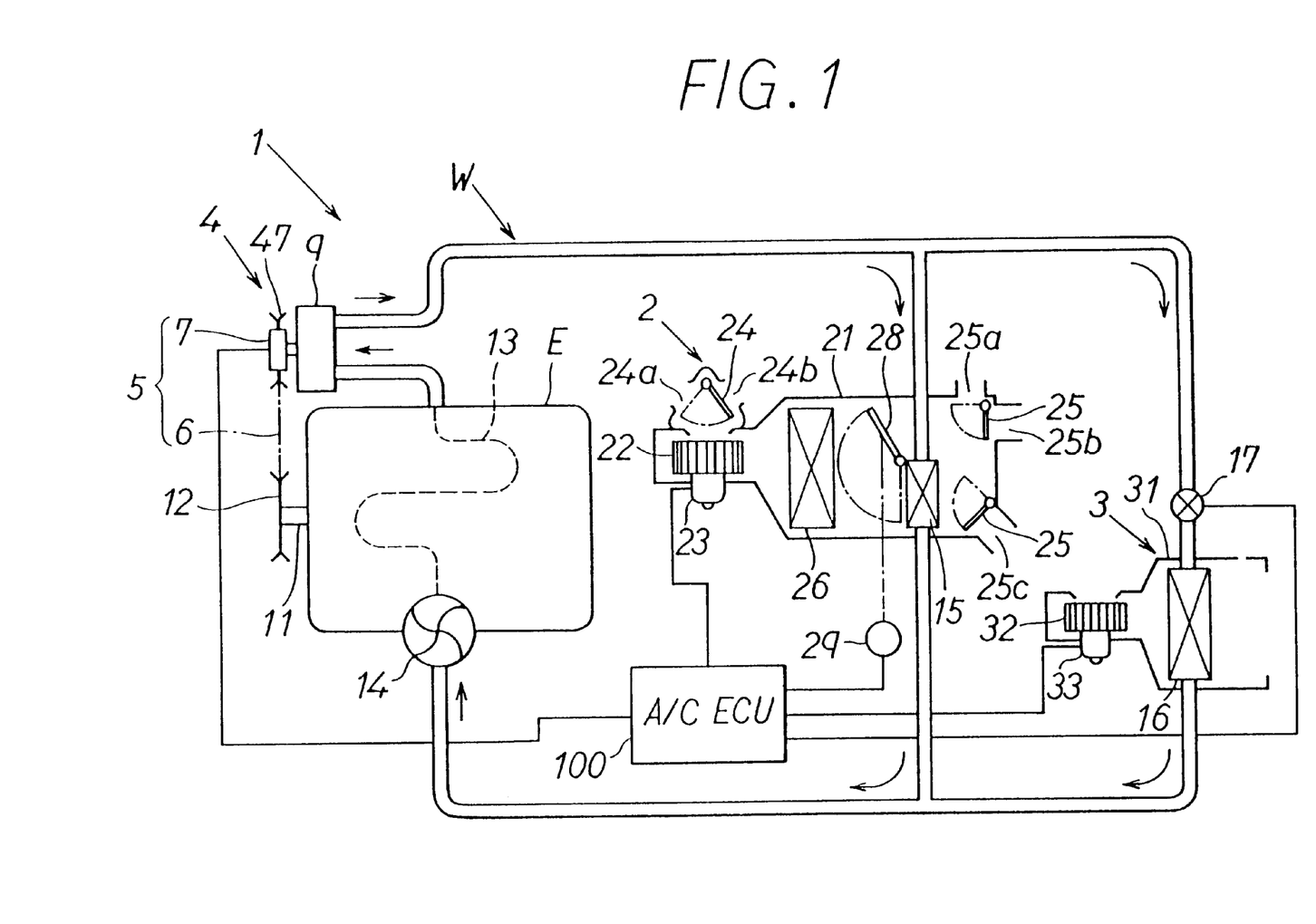
FIG. 1 is a schematic diagram showing an entire construction of an air-conditioning apparatus for a vehicle according to a first preferred embodiment of the present invention.

As shown in FIG. 1, an entire system 1 for a vehicle is equipped with a water-cooled diesel engine E (hereinafter referred to as "engine") disposed in an engine compartment of a vehicle, an air-conditioning unit 2 for air-conditioning a passenger compartment, a rear heating unit 3 for heating a rear-side of the passenger compartment, a heat-generating unit using a shearing force 4 for heating cooling water for cooling the engine E, an air-conditioning ECU 100 for controlling the air-conditioning unit 2 and the rear heating unit 3, and an engine ECU 200 for controlling the engine E.

Figure 2:
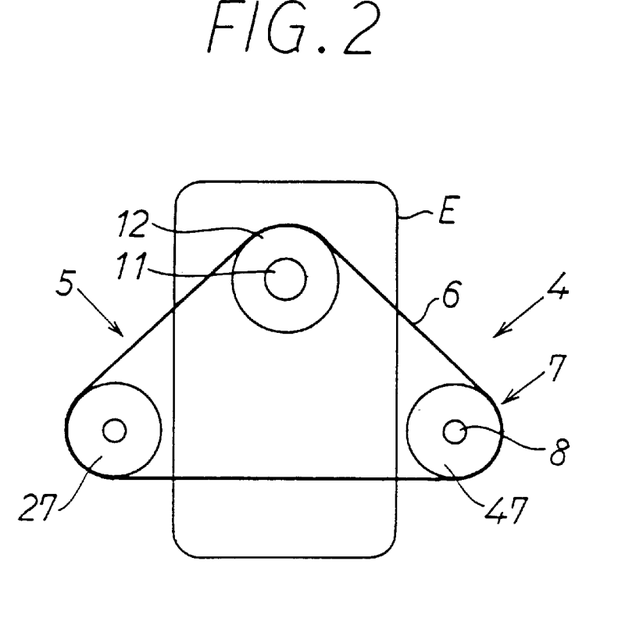
FIG. 2 is a schematic diagram showing an engine and a belt transmitting mechanism according to the first embodiment.

The engine E is provided with a cylinder block and a water jacket 13 around a cylinder head. A crank pulley 12 connecting to a V-belt 6 described later is attached to an output shaft (i.e., crankshaft) 11 of the engine E. The water jacket 13 is disposed in a cooling water circuit W through which the cooling water circuits.

In the cooling water circuit W, there is disposed a water pump 14 for compulsorily pumping the cooling water, a radiator (not shown) for cooling the cooling water by heat exchanging the cooling water and air, a front heater core 15 for heating air by heat exchanging the cooling water and air, a rear heater core 16 for heating air by heat-exchanging the cooling water and air, a water valve 17 for controlling a supply and an interruption of the cooling water into the rear heater core 16, and the like. The water pump 14 is disposed at an upstream side of the water jacket 13 of the engine E and is rotated by the output shaft 11 of the engine E.

The air-conditioning unit 2 includes a front duct 21, a front blower 22, a refrigeration cycle, and a front heater core 15. At an upstream air side of the front duct 21, there is rotatably provided an inside/outside air switching damper 24 for selectively opening and closing an outside air inlet 24a and an inside air inlet 24b to switch an air inlet mode. At a downstream air side of the front duct 21, there is rotatably provided an air mode switching damper 25 for selectively opening and closing a defroster air outlet 25a, a face air outlet 25b and a foot air outlet 25c to switch an air outlet mode.

The front blower 22 is rotated by a blower motor 23 to generate an air flow toward the passenger compartment in the front duct 21.

The refrigerant cycle includes a compressor (i.e., refrigerant compressor), a condenser (i.e., a refrigerant condenser), a receiver (i.e., gas-liquid separator), an expansion valve (i.e., decompressing device) and the evaporator (i.e., refrigerant evaporator) 26.

The compressor is equipped with an electromagnetic clutch (hereinafter referred to as "clutch") 27, and compresses refrigerant sucked from the evaporator 26 and discharges the compressed refrigerant toward the condenser. The clutch 27 is connected to a crank pulley 12 (see FIG. 2) attached to the output shaft 11 of the engine E through the V-belt 6. When an electromagnetic coil of the clutch 27 is electrified, an output portion (i.e., armature, inner hub) is attracted to an input portion of the rotor so that a driving power is transmitted to the compressor. The evaporator 26 is disposed in the front duct 21 to cool air flowing therethrough.

The front heater core 15 is disposed in the front duct 21 at a downstream air side (i.e., downwind side) of the evaporator 26 and is connected to the cooling water circuit W at a downstream side of the heat-generating unit 4 with reference to the flow direction of the cooling water. The front heater core 15 heats air by heat-exchanging the air having passed through the evaporator 26 and the cooling water.

At an upstream air side of the front heater core 15, there is rotatably provided an air-mixing damper 28. The air-mixing damper 28 adjusts a ratio between an amount of air (i.e., warm air) passing through the front heater core 15 and an amount of air (i.e., cool air) bypassing the front heater core 15 so that a temperature of air blown into the passenger compartment can be adjusted. The air-mixing damper 28 is driven by an actuator (i.e., damper driving means) such as a servomotor 29 through a ring plate or a plurality of ring plates.

The rear heating unit 3 includes a rear duct 31, a rear blower 32, and a rear heater core 16. A foot air outlet (not shown) is opened at a downstream air side of the rear duct 31.

The rear blower 32 is driven by a blower motor 33 to generate an air flow toward the passenger compartment within the rear duct 31.

The rear heater core 16 is disposed in the rear duct 31 and is connected to the cooling water circuit W at a downstream side of the heat-generating unit 4 with reference to the flow direction of the cooling water through a water valve 17. The rear heater core 16 heats air by heat-exchanging air passing through the rear duct 31 and the cooling water.

Next, the heat-generating unit 4 will be described briefly with reference to FIGS. 1 through 4.

The heat-generating unit 4 includes a belt transmitting mechanism 5 connected to and driven by the output shaft 11 of the engine E, and a viscous heater 9 having a shaft 8.

The belt transmitting mechanism 5 includes a multi-stage type V-belt 6 hung on the crank pulley 12 attached to the output shaft 11 of the engine E and an electromagnetic clutch 7 (hereinafter referred to as "viscous clutch") connected to and driven by the output shaft 11 of the engine E through the V-belt 6.

The V-belt 6 transmits a driving force (i.e., driving power) of the engine E to a shaft 8 of the viscous heater 9 through the viscous clutch 7. In the first embodiment, the V-belt 6 is hung on the clutch 27 and the viscous clutch 7.

Figure 3:
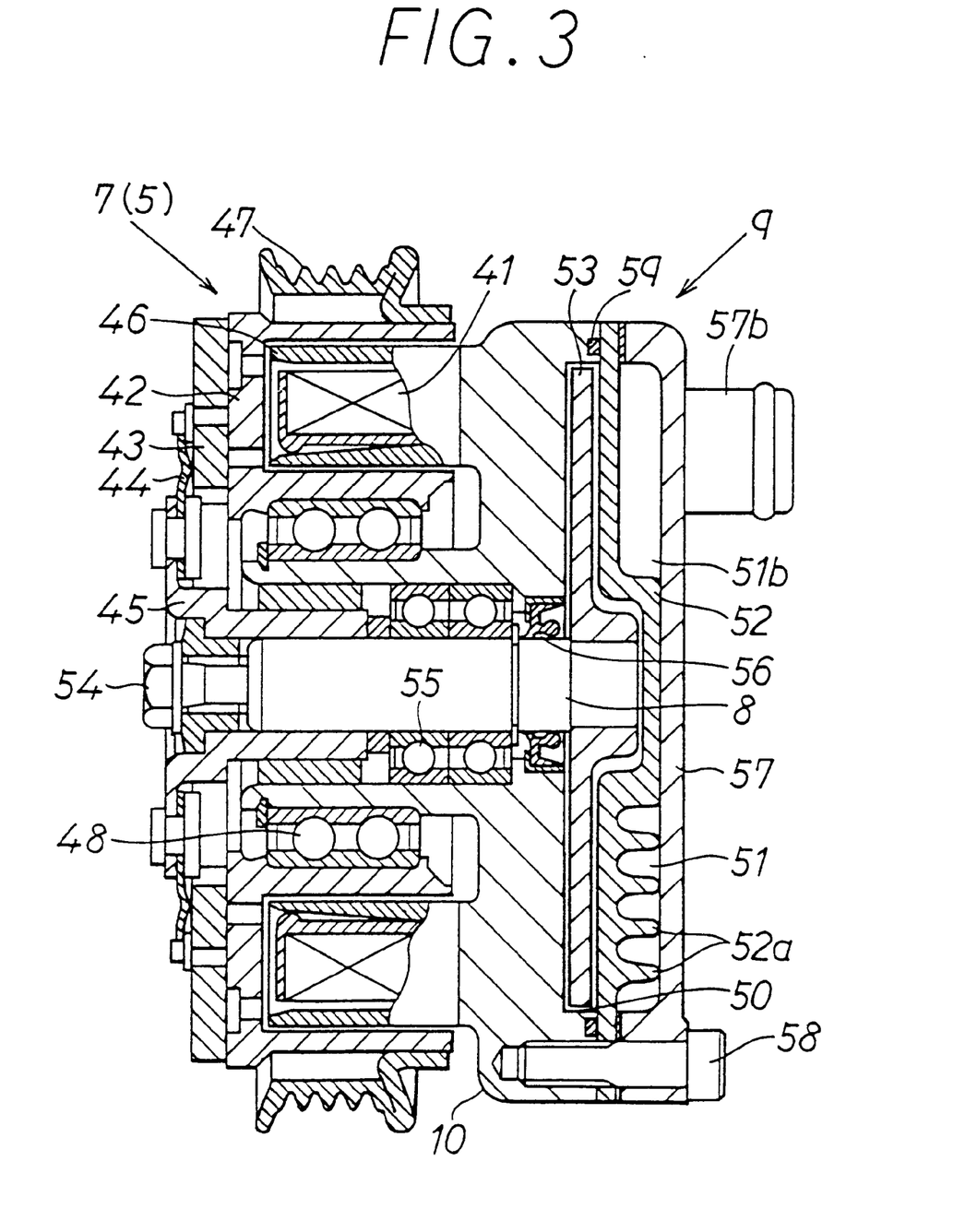
FIG. 3 is a cross-sectional view showing a viscous clutch and a viscous heater according to the first embodiment.

As shown in FIG. 3, the viscous clutch 7 includes an electromagnetic coil 41 for generating a magnetomotive force when being electrified, a rotor 42 rotated by the engine E, an armature 43 attracted toward the rotor 42 rotated by the magnetomotive force of the electromagnetic coil 41, and an inner hub 45 connected to the armature 43 with a plate spring 44 and supplying a rotational force to the shaft 8 of the viscous heater 9.

The electromagnetic coil 41 is formed by winding a conductive lead wire covered with an insulating material. The electromagnetic coil 41 is disposed in the stator 46 and is fixedly molded in the stator 46 with an epoxy resin. The stator 46 is fixed on a front surface of a housing 10 of the viscous heater 9.

A V-pulley 47 having the V-belt 6 on a periphery thereof is connected to the rotor 42 by connecting means such as welding. The rotor 42 is a rotating body which always rotates by the driving force of the engine E, transmitted thereto through the V-belt 6. The rotor 42 is formed of magnetic material to have a U-shaped cross section and is rotatably supported on an outer periphery of the housing 10 of the viscous heater 9 through a bearing 48 disposed in an inner periphery thereof.

The armature 43 has a friction surface formed in a ring-shaped plate, which is opposed to a friction surface of the rotor 42, formed in a ring-shaped plate, by an air gap therebetween. For example, a clearance between the friction surfaces is 0.5 mm. The armature is made of magnetic material. When the armature 43 is attracted to the friction surface of the rotor 42 by the electromotive force of the electromagnetic coil 41, the driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member. When the electric current supplying to the electromagnetic coil 41 is stopped, the plate spring displaces the armature 43 in a direction (i.e., the left direction in FIG. 3) so that the armature 43 is separated (released) from the friction surface of the rotor 42 to return the armature 43 to an initial position thereof.

The inner hub 45 is used as an output portion of the viscous clutch 7. The input side of the inner hub 45 is connected to and driven by the armature 43 through the plate spring 44 and the output side of the inner hub 45 is connected to the shaft 8 of the viscous heater 9 with a spline fitting connection.

The viscous heater 9 is a supplementary heating source of the engine E which is the main heating source. The viscous heater 9 includes the shaft 8 rotated by the engine E through the V-belt 6 and the viscous clutch 7, a housing 10 for rotatably supporting the shaft 8, a separator 52 for dividing an inner space of the housing 10 into a heat-generating chamber 50 and a cooling water passage 51, and a rotor 53 rotatably disposed in the housing 10.

The shaft 8 is an input shaft which is fixedly fastened to the inner hub 45 of the viscous clutch 7 by fastening means such as a bolt and rotates integrally with the armature 43. The shaft 8 is rotatably disposed in an inner periphery of the housing 10 through a bearing 55 and a sealing member 56. The sealing member 56 employs an oil-seal for preventing a leakage of the viscous fluid.

The housing 10 is made of a metallic member such as aluminum alloy. A cover 57 formed in a ring-shaped plate is fixedly fastened to a rear end of the housing 10 by fastening means 58 such as a bolt and a nut. The separator 52 and a sealing member 59 is attached on a surface where the housing 10 and the cover 57 are joined. The sealing member 59 employs an O-ring for preventing a leakage of the cooling water.

The separator 52 is a partition member which is made of a metallic member such as aluminum alloy, which is superior in heat conductivity. An outer peripheral portion of the separator 52 is sandwiched between a cylindrical portion of the housing 10 and a cylindrical portion of the cover 57. The heat-generating chamber for sealing viscous fluid (e.g., silicon oil) which generates heat when a shearing force is applied thereto is formed between a front end surface of the separator 52 and a rear end surface of the housing 10.

The cooling water passage 51 is formed between a rear end surface of the separator 52 and an inner surface of the cover 57, and is liquid-tightly partitioned from the outside. The cooling water for cooling the engine E flows through the cooling water passage 51. Further, a plurality of fin portions 52a having a substantially arcuate shape, for efficiently transmitting heat of the viscous fluid to the cooling water is integrally formed on the rear end surface of the separator 52 at a lower side.

Instead of the fin portions 52a, the rear end surface of the separator 52 may be formed in a convex and concave shape, or a heat transmission facilitating member such as corrugated fins and fine pin fins may be formed on the outer wall surface of cover 57. Further, a labyrinth seal may be formed between the separator 52 and the rotor 53, and may be used as the heat-generating chamber 50.

Figure 4:
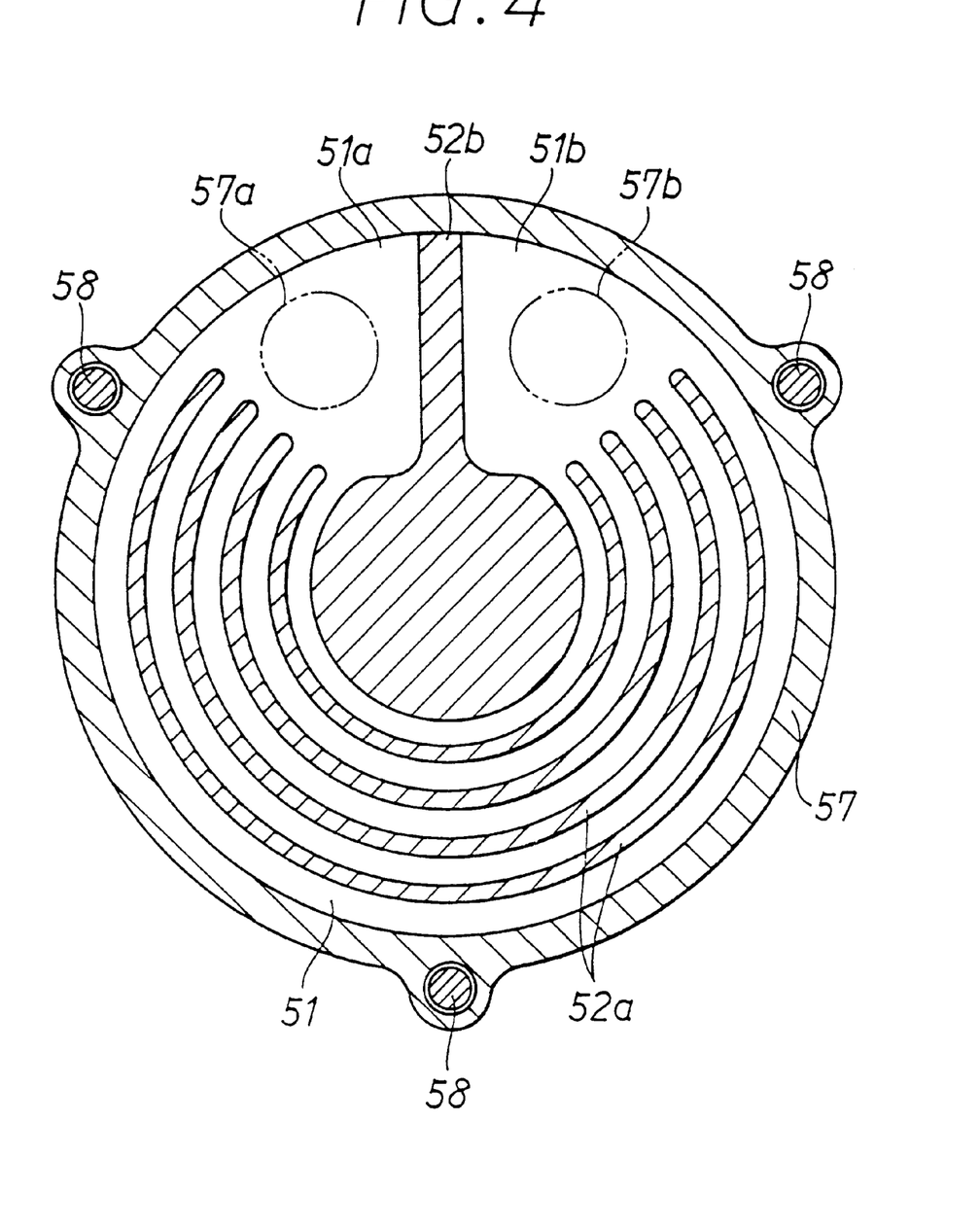
FIG. 4 is a cross-sectional view showing the viscous heater according to the first embodiment.

As shown in FIG. 4, a partition wall 52b for partitioning the cooling water passage 51 into an upstream side water passage 51a and a downstream side water passage 51b is formed to protrude from the rear end surface of the separator 52. An inlet side cooling water pipe 57a through which the cooling water flows into the cooling water passage 51 and an outlet side cooling water pipe 57b through which the cooling water flows out from the cooling water passage 51 are connected to an outer wall portion of the cover 57 near the partition wall 52b.

The rotor 53 is rotatably disposed in the heat-generating chamber 50 and is fixed to an outer periphery of the rear end portion of the shaft 8. A plurality of groove portions (not shown) are formed on an outer peripheral surface or both side wall surfaces of the rotor 53, and a protrusion portion is formed between each of the adjacent groove portions. When the driving force of the engine E is supplied to the shaft 8, the rotor 53 rotates integrally with the shaft 8 to generate a shearing force to the viscous fluid sealed in the heat-generating chamber 50.

Figure 5:
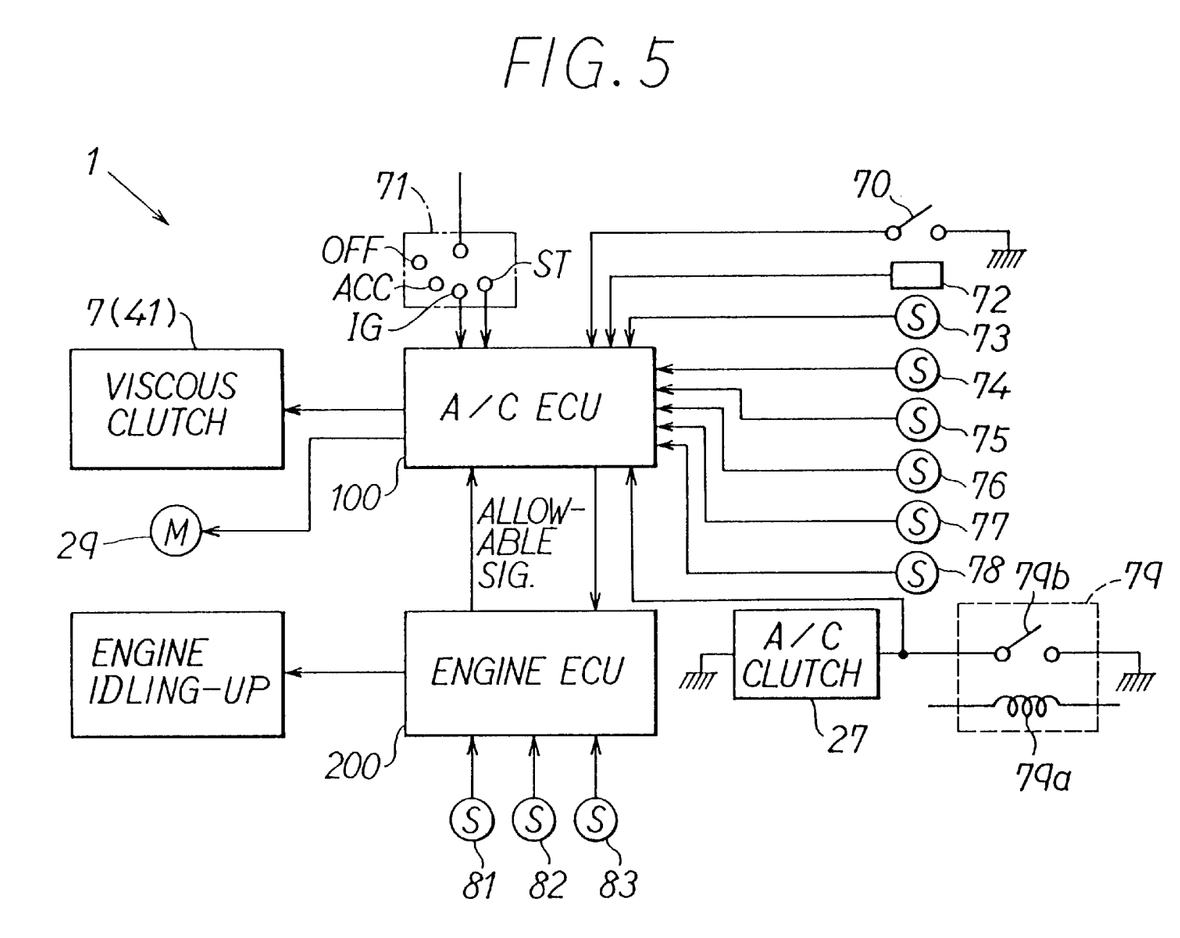
FIG. 5 is a block diagram showing an electric circuit of the air-conditioning apparatus for a vehicle according to the first embodiment.

Next an air-conditioning ECU 100 will be described briefly with reference to FIGS. 1, and 5–7. FIG. 5 shows an electric circuit of the system 1.

The air-conditioning ECU 100 is an electric circuit for performing a computer control of a cooling and heating equipment such as the compressor and the viscous heater 9 of the air-conditioning unit 2. The air-conditioning ECU 100 is a microcomputer in which a CPU, a ROM, and a RAM are incorporated.

The air-conditioning ECU 100 performs an air-conditioning control for the passenger compartment by controlling a cooling and heating equipment including the electromagnetic coil 41 of the viscous clutch 7, the servo-motor 29 of the air-mixing damper 28, an electromagnetic coil of the air-conditioning clutch 27, and the rear blower 32, and the like, based on input signals from a viscous switch 70, an ignition switch 71, a temperature setting unit 72, an inside air temperature sensor 73, an outside air temperature sensor 74, a sunlight sensor 75, a cooling water temperature sensor 76, an oil temperature sensor 77, a post-evaporator temperature sensor 78, an air-conditioning clutch relay 79 and the engine ECU 200, and a pre-stored control program (see FIG. 6), and the like.

The viscous switch 70 is a switch for preferring a heating operation for the passenger compartment by using the viscous heater 9. When the viscous switch 70 is set on, a heating preference signal is output to the air-conditioning ECU 100. Further, the viscous switch 70 is an economical fuel consumption preference switch for giving an improvement of the fuel consumption rate (i.e., fuel economy) priority. When the viscous switch 70 is set off, a fuel consumption preference signal is output to the air-conditioning ECU 100.

The ignition switch 71 includes each terminal of OFF, ACC, ST and IG. The terminal of ST is a stator operation switch for outputting a signal for supplying an electric current to a stator to the air-conditioning ECU 100.

The temperature setting unit 72 sets a temperature of the passenger compartment to a desired temperature and outputs a set temperature signal to the air-conditioning ECU 100.

The inside air temperature sensor 73 employs a thermistor, for example. The inside air temperature sensor 73 detects a temperature of air in the passenger compartment (i.e., inside air temperature of the passenger compartment), and outputs an inside air temperature detection signal to the air-conditioning ECU 100.

The outside air temperature 74 employs a thermistor, for example. The outside air temperature sensor 74 detects a temperature of air outside the passenger compartment of the vehicle (i.e., outside air temperature), and outputs an outside air temperature detection signal to the air-conditioning ECU 100.

A photo-diode is used as the sunlight sensor 75, for example. The sunlight sensor 75 detects an amount of sunlight entering the passenger compartment, and outputs a sunlight detection signal to the air-conditioning ECU 100.

The cooling water temperature sensor 76 employs a thermistor, for example, to detect a temperature of the cooling water in the cooling water circuit W (in this embodiment, a temperature of the cooling water in the outlet side cooling water pipe 57b of the cooling water passage 51 of the viscous heater 9). The cooling water temperature sensor 76 outputs a cooling water temperature detection signal to the air-conditioning ECU 100.

The oil temperature sensor 77 employs a thermistor, for example. The oil temperature sensor 77 detects a temperature of the viscous fluid (i.e., oil temperature) in the heat-generating chamber 50, and outputs an oil temperature detection signal to the air-conditioning ECU 100. As a physical amount related to a temperature of the viscous fluid in the heat-generating chamber 50, the temperature of the viscous fluid detected by the oil temperature sensor 77 may be used. In this case, the oil temperature sensor 77 is used as physical amount detection means of the present invention.

The post-evaporator temperature sensor 78 employs a thermistor, for example. The post-evaporator temperature sensor 78 detects a temperature of air immediately after passing through the evaporator 26, and outputs a post-evaporator temperature detection signal to the air-conditioning ECU 100. Further, as means for detecting environmental conditions, an outlet air temperature sensor disposed in either one of air outlets of the front duct 21 may be used for detecting a temperature of air blown into the passenger compartment.

The air-conditioning clutch relay 79 includes a relay coil 79a and a relay switch 79b. When an electric current is supplied to the relay coil 79a, the relay switch 79b is closed, thereby an electric current is supplied to the air-conditioning clutch 27.

Figure 6:
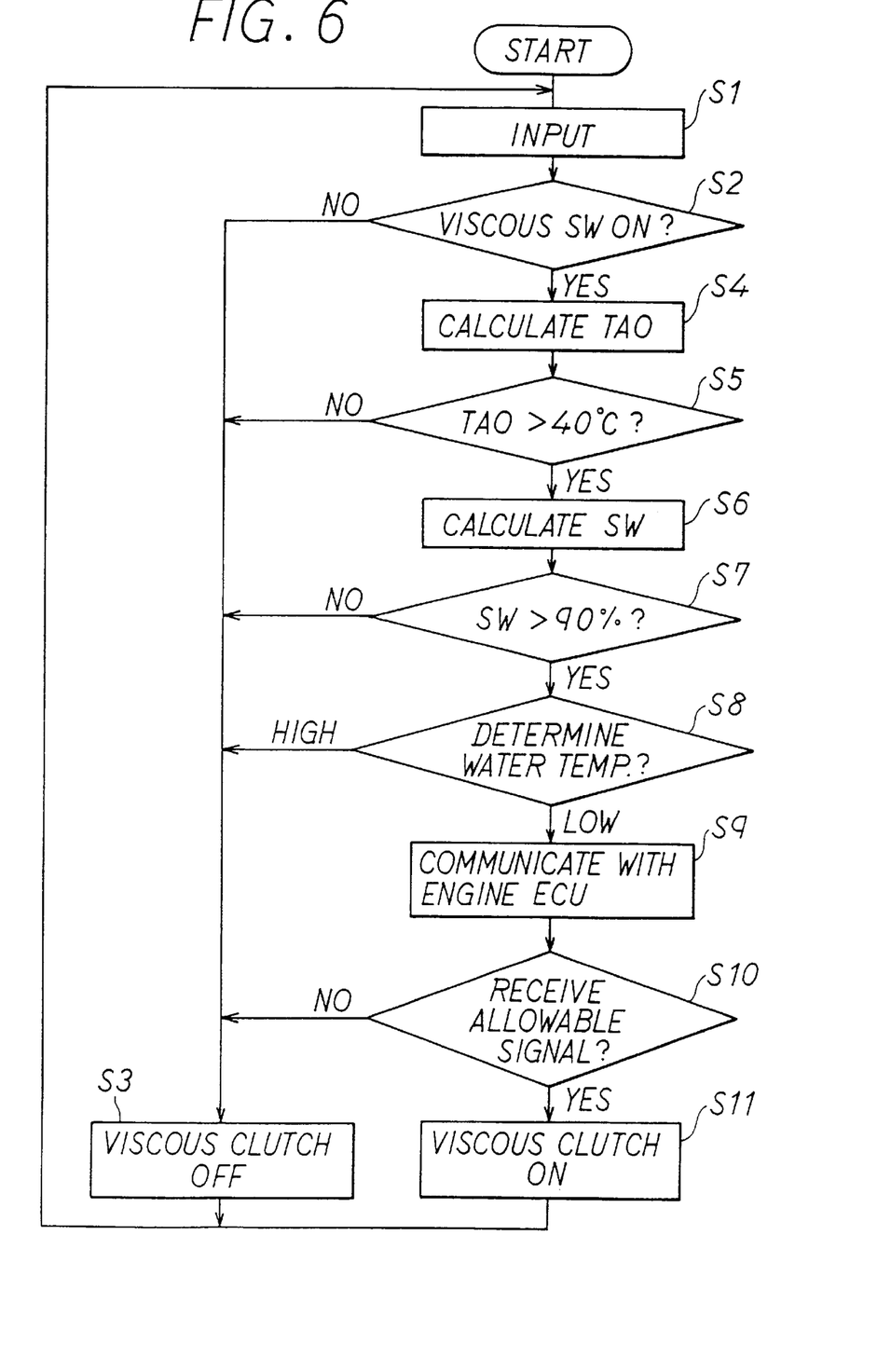
FIG. 6 is a flow chart of a control program of an air conditioning ECU according to the first embodiment.

Next, a control of the viscous heater 9 of the air-conditioning ECU 100 will be described with reference to FIGS. 1–7. FIG. 6 is a flow chart of a control program of the air-conditioning ECU 100.

Firstly, various kinds of sensor signals and switch signals are input at step S1.

Next, it is determined whether or not the viscous switch 70 is set on, that is, whether or not the heating preference signal or the economical fuel consumption preference signal is input at step S2. When the determination is "NO", it is not necessary to heat the passenger compartment and a priority is given on the improvement of the fuel consumption rate of the engine E. Therefore, the electromagnetic coil 41 of the viscous clutch 7 is turned off, that is, the electric current supplying to the electromagnetic coil 41 of the viscous clutch 7 is stopped, and the operation of the viscous heater 9 is stopped at step S3. Next, it proceeds to the process at the step S1.

At the step S2, the determination is "YES", a target air temperature TAO of air blown into the passenger compartment is calculated based on the following formula (1) at step S4.

$$TAO = Kset \times Tset - Kr \times Tr - Kam \times Tam - Ks \times Ts + C \quad (1)$$

wherein, Kset is a temperature setting gain, Tset is a temperature set by the temperature setting unit 72, Kr is an inside air temperature gain, Tr is an inside air temperature detected by the inside air temperature sensor 73, Kam is an outside air temperature gain, Tam is an outside air temperature detected by the outside air temperature sensor 74, Fs is a sunlight gain, Ts is an amount of sunlight, detected by the sunligh sensor 75, and C is a correction constant.

Next it is determined whether or not the target air temperature TAO is higher than a predetermined temperature (for example, 40° C.) at step S5. When the determination is "NO", it proceeds to the process at the step S3, and the electromagnetic coil 41 of the viscous clutch 7 is set off.

On the other hand, when the determination is "YES" at the step S5, a target damper opening degree SW is calculated based on the following formula (2) at step S6.

$$SW = [(TAO - TE)/(TW - TE)] \times 100\% \quad (2)$$

in which, TAO is the target air temperature calculated at the step S4, TE is a temperature detected by the post-evaporator temperature sensor 78, and TW is a cooling water temperature detected by the cooling water temperature sensor 76.

Next, it is determined whether or not the target damper opening degree SW calculated at the step S6 is more than a predetermined damper opening degree (e.g., 90%) of the air-mixing damper 28 at step S7. That is, it is determined whether or not the heating operation is in the maximum heating operation at the step S7. When the determination is "NO", it proceeds to the process at the step S3, and the electromagnetic coil 41 of the viscous clutch 7 is set off.

At the step S7, it may be determined whether or not the heating operation is in the maximum heating operation or the maximum heating operation is desired in the passenger compartment, by the other maximum heating determination means. For example, when a temperature difference between a set temperature set by the temperature setting unit 72 and an inside air temperature detected by the inside air temperature sensor 73 is more than a predetermined temperature (e.g., 20° C.), it may be determined that the maximum heating operation is desired. When an outer air temperature detected by the outer air temperature sensor 74 is lower than −5° C., it may be determined that the maximum heating operation is desired. Further, when the detected opening degree of the air-mixing damper 28 is more than 90%, it may be determined that the maximum heating operation is desired.

Next, it is determined whether or not the electromagnetic coil 41 of the viscous clutch 7 is set on or off according to a characteristics graph (reference to FIG. 7) of the viscous heater control based on the cooling water temperature, pre-stored in a memory circuit (e.g., ROM). That is, it is determined whether or not the cooling water temperature detected by the cooling water temperature sensor 76 is higher than the set cooling water temperature (i.e., the set value) at step S8.

Figure 7:
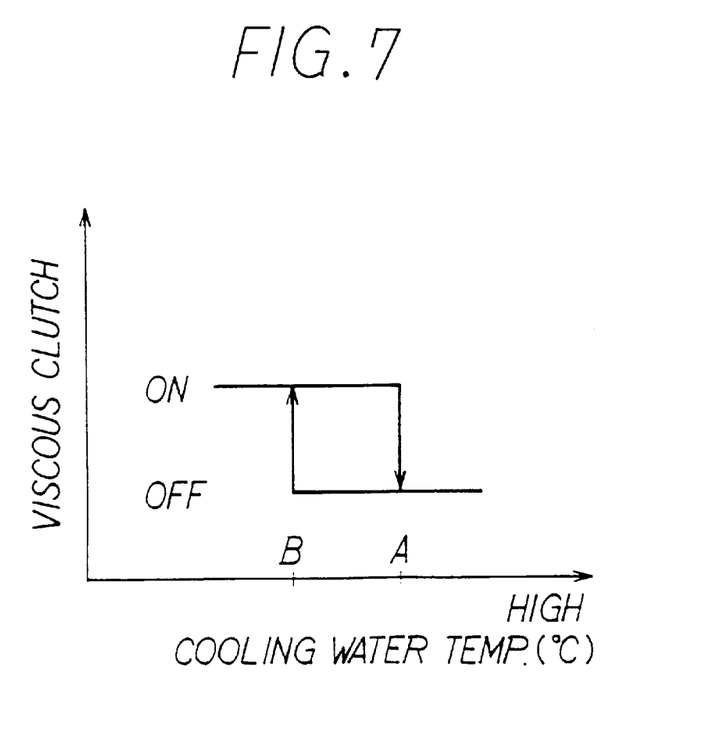
FIG. 7 is a graph for a control process of the air conditioning ECU, showing a relationship between a cooling water temperature and an operation state of a viscous clutch according to the first embodiment.

More specifically, as shown in the characteristics graph of FIG. 7, a hysteresis is given between the first set cooling water temperature A (e.g., 80° C.) and the second set cooling water temperature B (e.g., 70° C.). When the cooling water temperature is higher than the set cooling water temperature, the electromagnetic coil 41 of the viscous clutch 7 is set off. When the cooling water temperature is lower than the set cooling water temperature, the electromagnetic coil 41 of the viscous clutch 7 is set on. The hysteresis is set to the characteristics graph in FIG. 8; however, the hysteresis may not be given.

When the cooling water temperature is higher than the set cooling temperature at the step S8, it proceeds to the step S3, and the electromagnetic coil 41 of the viscous clutch 7 is set off.

Further, when the cooling water temperature is lower than the set cooling water temperature, it performs a communication (transmits a signal to and receives a signal from) with the engine ECU 200 at step S9.

Next, it is determined whether or not an allowable signal for allowing the electromagnetic coil 41 of the viscous clutch 7 to be turned on is received from the Engine ECU 200 at step 10. When the determination is "NO", it proceeds to the process at the step S3, and the electromagnetic coil 41 of the viscous clutch 7 is turned off.

When the determination is "YES" at the step S10, the electromagnetic coil 41 of the viscous clutch 7 is turned on to compensate an insufficient heating capacity in the maximum heating operation. That is, an electric current is supplied to the electromagnetic coil 41 of the viscous clutch 7 so that the viscous heater 9 operates at step 11. Next, it proceeds to the process at the step 1.

Next, the engine ECU 200 will be briefly described with reference to FIGS. 1–5.

The engine ECU 200 is an electric circuit for an engine control system for performing a computer control of the engine E. The engine ECU 200 is a microcomputer in which a CPU, a ROM, and a RAM are incorporated.

The engine ECU 200 performs an idling rotational speed control (i.e., idling-up control) of the engine E, a fuel injection amount control, a fuel injection timing control, an intake air throttle control, an electric current control to a glow plug, and the like, based on an engine rotational speed sensor 81, a vehicle speed sensor 82, a throttle opening sensor 83, input signals input from the air-conditioning ECU 100, and the pre-stored control program. The engine ECU 200 also transmits signals required for processes of the air-conditioning ECU 100 thereto.

The engine rotational speed sensor 81 detects a rotational speed of the output shaft 11 of the engine E and outputs an engine rotational speed signal to the engine ECU 200.

As the vehicle speed sensor 82, a reed switch type vehicle speed sensor, a photo-electric type vehicle speed sensor, or a MRE (i.e., Magnetic Resistance Element) type vehicle speed sensor can be used, for example. The vehicle speed sensor 82 detects a speed of the vehicle, and outputs a vehicle speed signal to the engine ECU 200.

The throttle opening sensor 83 detects an opening degree of the throttle valve disposed in an intake pipe of the engine E and outputs a throttle opening signal to the engine ECU 200.

Next, a viscous heater control of the engine ECU 200 will be briefly described with reference to FIGS. 1–5.

Firstly, various kinds of sensor signals from the engine rotational speed sensor 81, the vehicle speed sensor 82, the throttle opening sensor 83 and the like are input to the engine ECU 200.

Next, the engine ECU 200 determines whether an allowable signal for allowing the electromagnetic coil 41 of the viscous clutch 7 to be turned on or an unallowable signal for allowing the electromagnetic clutch 41 of the viscous clutch 7 not to be turned on is transmitted to the air-conditioning ECU 100. When it is determined that the allowable signal is transmitted, an amount of intake air is increased so that an idling rotational speed is increased stepwise, that is, an idling-up control is performed.

Next, an operation of the system 1 according to the first embodiment will be briefly described with reference to FIGS. 1–7.

When the engine E starts, the output shaft 11 of the engine E rotates, and the driving force of the engine E is transmitted to the rotor 42 through the V-belt 6 of the belt transmitting mechanism 5. However, when the maximum heating operation is not desired, the electromagnetic coil 41 of the viscous clutch 7 is turned off. That is, because the electromagnetic coil 41 of the viscous clutch 7 is turned off, the armature 43 is not attracted toward the friction surface of the rotor 42. Thus, at this time, the driving force of the engine E is not transmitted to the inner hub 45 and the shaft 8.

Because the shaft 8 and the rotor 53 do not rotate, a shearing force is not applied to the viscous fluid in the heat-generating chamber 50, and the viscous fluid does not generate heat. Therefore, even if the cooling water heated in the water jacket 13 of the engine E flows through the cooling water passage 51 of the viscous heater 9, the cooling water is supplied to the front heater core 15 without being heated. Therefore, the heating operation of the passenger compartment is started with a small heating capacity.

When the viscous switch 70 is set on; the maximum heating operation in which air blown out from the front duct 21 has the highest temperature is desired; the cooling water temperature is lower than the set cooling temperature (i.e., the set value); and the allowable signal is received from the engine ECU 200, the electromagnetic coil 41 of the viscous clutch 7 is turned on. Because the electromagnetic coil 41 of the viscous clutch 7 is turned on, the armature 43 is attracted to the friction surface of the rotor 42 by magnetomotive force of the electromagnetic coil 41 to transmit the driving force of the engine E to the inner hub 45 and the shaft 8.

Because the rotor 53 rotates integrally with the shaft 8, a shearing force is applied to the viscous fluid in the heat-generating chamber 50 to generate heat. Therefore, when the cooling water heated in the water jacket 13 of the engine E passes through the cooling water passage 51 of the viscous heater 9, the cooling water is heated while absorbing heat generated in the viscous fluid through the plurality of the fin portions 52a formed integrally with the separator 52. The cooling water heated by the viscous heater 9 is supplied to the front heater core 15 so that the heating operation of the passenger compartment is performed with a large heating operation.

The heating capacity of the viscous heater 9 may be set freely in advance by a viscous coefficient of the viscous fluid sealed in the heat-generating chamber 50. That is, the larger the viscous coefficient the viscous fluid has, the larger the shearing force applied by the rotation of the rotor 53 becomes. Therefore, the heat-generating capacity of the viscous heater 9 is increased, and the load and the fuel consumption rate of the engine E become larger. On the other hand, the smaller the viscous coefficient the viscous fluid has, the smaller the shearing force applied by the rotation of the rotor 53 becomes. Therefore, the heat-generating capacity of the viscous heater 9 is decreased, and the load and the fuel consumption rate of the engine E become lower.

As described above, according to the first embodiment, when the maximum heating operation is desired, in which sufficient heating capacity is necessary, the electromagnetic coil 41 of the viscous clutch 7 is turned on. Therefore, the driving force of the engine E is transmitted to the viscous heater 9 through the belt transmitting mechanism 5 and the viscous clutch 7. By the operation of the viscous heater 9, the cooling water passing through the cooling water passage 51 of the viscous heater 9 absorbs heat generated in the viscous fluid. In this way, the cooling water heated in the viscous heater 9 is supplied to the front heater core 15 or the rear heater core 16.

Thus, the temperature of the cooling water flowing into the front heater core 15 or the rear heater core 16 rises so that the temperature of the cooling water in the cooling water circuit W can be maintained at a predetermined temperature (e.g., 80° C.). Therefore, a radiating amount of the front heater core 15 or the rear heater core 16 increases, and air sufficiently heated when passing through the front heater core 15 or the rear heater core 16 is blown into the passenger compartment to prevent the heating capacity for the passenger compartment from being lowered.

Further, according to the first embodiment, when a large heating capacity is not necessary and the maximum heating operation is not desired, the electromagnetic coil 41 of the viscous clutch 7 is turned off. Therefore, the driving force of the engine E is not transmitted to the viscous heater 9 through the belt transmitting mechanism 5 and the viscous clutch 7. Since large driving torque is not applied to the V-belt 6, the V-pulley 47, the shaft 8, and the rotor 53, the load of the engine E as wall as the load of the belt transmitting mechanism 5 can be reduced. Accordingly, because the fuel consumption rate of the engine E can be lowered, the cost for running the vehicle can be lowered. Further, it is possible to prevent a generation of abnormal noise due to the slipping of the V-belt 6.

According to the present invention, the determination whether the electromagnetic coil 41 of the viscous clutch 7 is turned on or off is not performed by only the temperature of the cooling water flowing from the viscous heater 9. Therefore, even if the cooling water temperature is less than the set temperature at warm-up operation in the summer, the electromagnetic coil 41 of the viscous clutch 7 is not turned on so that the operation of the viscous heater 7 is not started. Thus, even if silicon oil is used as the viscous fluid in the heat-generating chamber 50, a shearing force is not applied to the viscous fluid from the rotor 53. Therefore, the viscous fluid in the heat-generating chamber 50 does not generates an abnormal heat, and heat deterioration of the viscous fluid and mechanical deterioration due to a shearing force can be prevented.

Further, according to the first embodiment, when the viscous switch 70 as the heating preference switch is not set on and the cooling operation is necessary in the passenger compartment, that is, the heating operation is not necessary e.g., the target air temperature TAO is lower than a predetermined temperature (e.g., 40° C.), the large heating capacity is not necessary. Therefore, the electromagnetic coil 41 of the viscous clutch 7 is turned off so that the load of the engine E can be reduced.

In the system 1 according to the first embodiment, when the air-conditioning ECU 100 does not receive the allowable signal from the engine ECU 200, the electromagnetic coil 41 of the viscous clutch 7 is set off. Therefore, it is possible to reduce the load of the engine E and to improve the running performance and the driveability of the vehicle.

Figure 8:
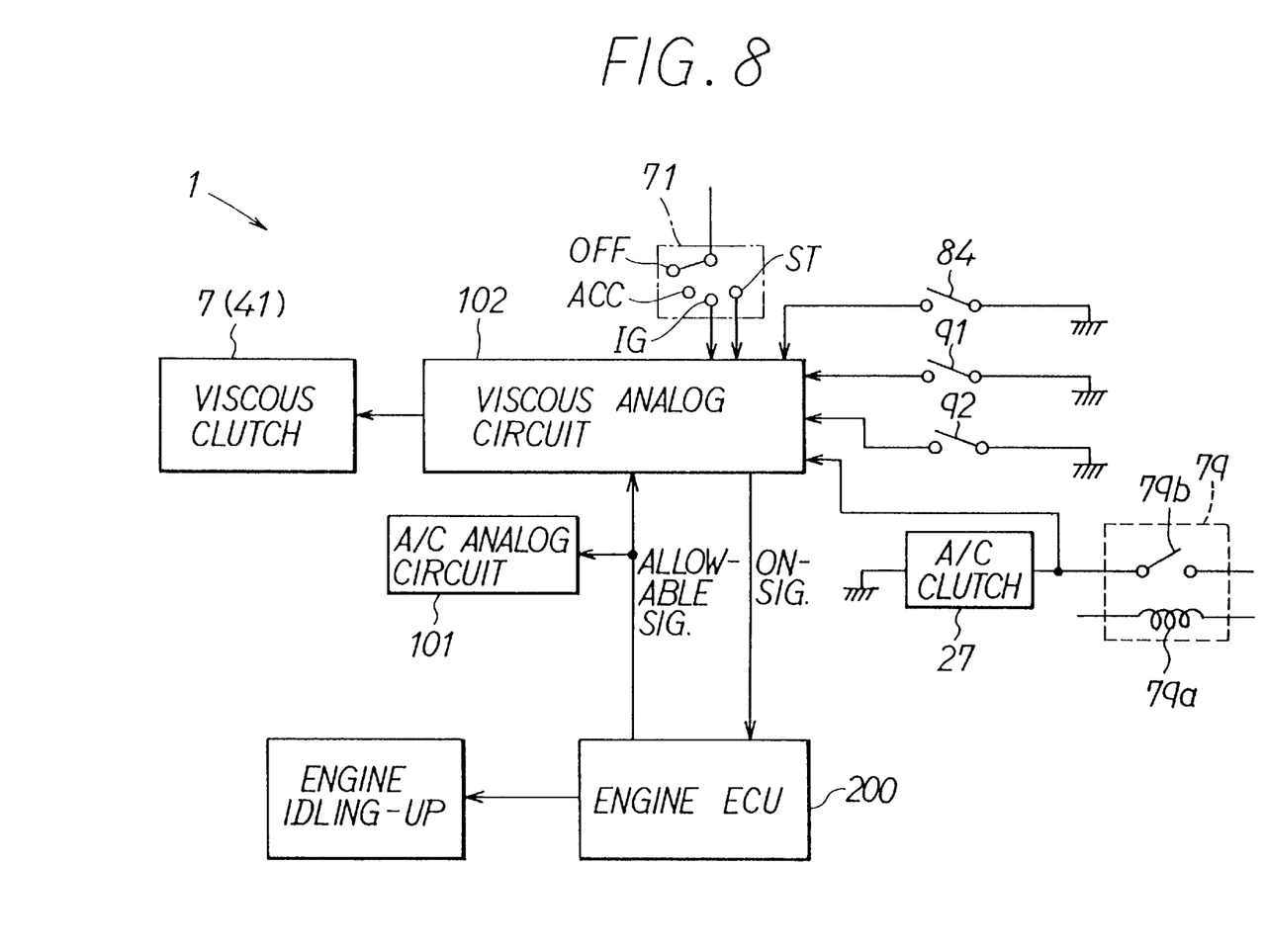
FIG. 8 is a block diagram showing an electric circuit of the air-conditioning apparatus for a vehicle according to a second preferred embodiment of the present invention.
Figure 9:
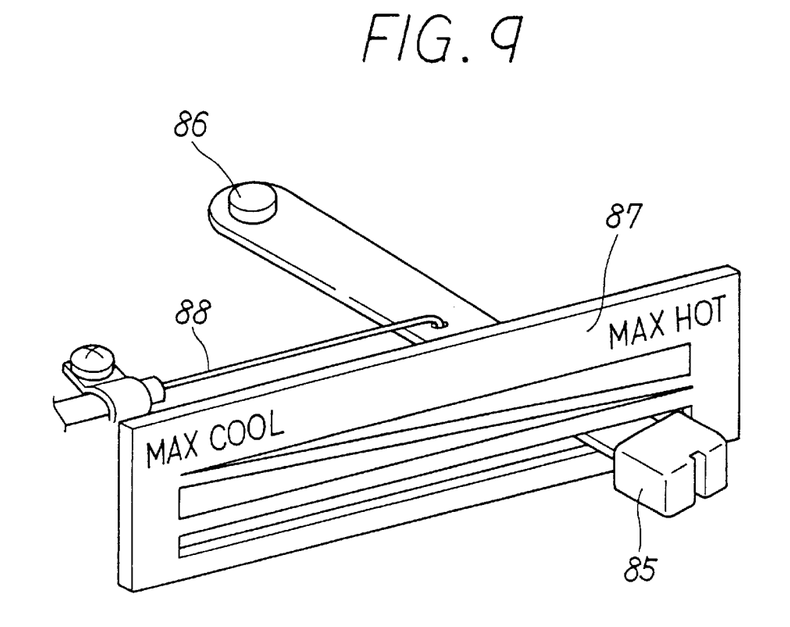
FIG. 9 is a perspective view showing a control panel and a temperature control lever according to the second embodiment.

A second preferred embodiment of the present invention will be described with reference to FIGS. 8 and 9. FIG. 8 shows an electric circuit for an air-conditioning apparatus according to the second embodiment. FIG. 9 shows a control panel and a temperature control lever according to the second embodiment.

In the second embodiment, as shown in FIG. 8, instead of the air-conditioning ECU 100 of the first embodiment, an air-conditioning analog circuit 101 for performing an analog control on the air-conditioning unit 2 and a viscous analog circuit 102 for performing an analog control on the viscous clutch 7 are formed in the electric circuit of the system 1.

To an input portion of the viscous analog circuit 102, there are connected a ST terminal and an IG terminal of the ignition switch 71, a touch switch 84, a cooling water temperature switch 91, an oil temperature switch 92, an electromagnetic coil of the air-conditioning clutch 27, the air-conditioning clutch relay 79, and the engine ECU 200. To an output portion of the viscous analog circuit 102, there are connected the engine ECU 200 and the electromagnetic coil 41 of the viscous clutch 7.

The touch switch 84 is operated in a variable range of the temperature control lever 85. When the temperature control lever 85 is manually operated at a side for desiring the maximum heating operation (i.e., the MAX HOT side in FIG. 9), the touch switch 84 is turned on. When the temperature control lever 85 is manually operated at the other lever position, the touch switch 84 is turned off. As the position detection means for detecting the lever position of the temperature control lever 85, instead of the touch switch 84, a contact position sensor such as a micro-switch and a limit switch, a non-contact position sensor such as a proximity switch and a photoelectric switch, or a displacement sensor may be used.

The temperature control lever 85 is formed in the control panel 87 to rotate it around a supporting shaft 86 in the variable range between the MAX HOT and the MAX COOL in the FIG. 9. The temperature control lever 85 directly drives the air-mixing damper 28 through a wire cable 88, a ring plate (not shown), or two ring plates (not shown).

The cooling water temperature switch 91 is opened when a temperature of the cooling water in the cooling water circuit W (in the second embodiment, a temperature of the cooling water in the outlet side cooling water pipe 57b of the cooling water passage 51 of the viscous heater 9) is higher than a first set cooling water temperature A (e.g., 80° C.), and is closed when the temperature of the cooling water is lower than the first set cooling temperature A or a second set cooling water temperature B (e.g., 70–75° C.).

The oil temperature switch 92 is opened when a temperature of the viscous fluid in the viscous heater 9 is higher than a first set oil temperature A (e.g., 250° C.) and is closed when the first set temperature of the viscous fluid is lower than the first set oil temperature A or a second set oil temperature B (e.g., 200° C.).

Further, when the viscous analog circuit 102 determines that the viscous clutch 7 is set on and the engine ECU 200 receives the ON signal transmitted from the viscous analog circuit 102, the engine ECU 200 performs a calculation or determination based on the rotational speed of the engine E, the vehicle speed, the throttle opening degree, or the cooling water temperature and outputs an allowable signal or unallowable signal for allowing the air-conditioning unit 2 or the viscous heater 9 to be or not to be turned on to the viscous analog circuit 102.

In the second embodiment, when the cooling water switch 91 and the oil temperature switch 92 are set on, and the relay switch 79b of the air-conditioning clutch relay 79 is set off, and further the allowable signal is received from the engine ECU 200, at a time where the temperature control lever 85 is operated at the MAX HOT position and the touch switch 84 is set on, the electromagnetic coil 41 of the viscous clutch 7 is turned off by the viscous analog circuit 102. In this way, the effects similar to those in the first embodiment can be obtained.

Figure 10:
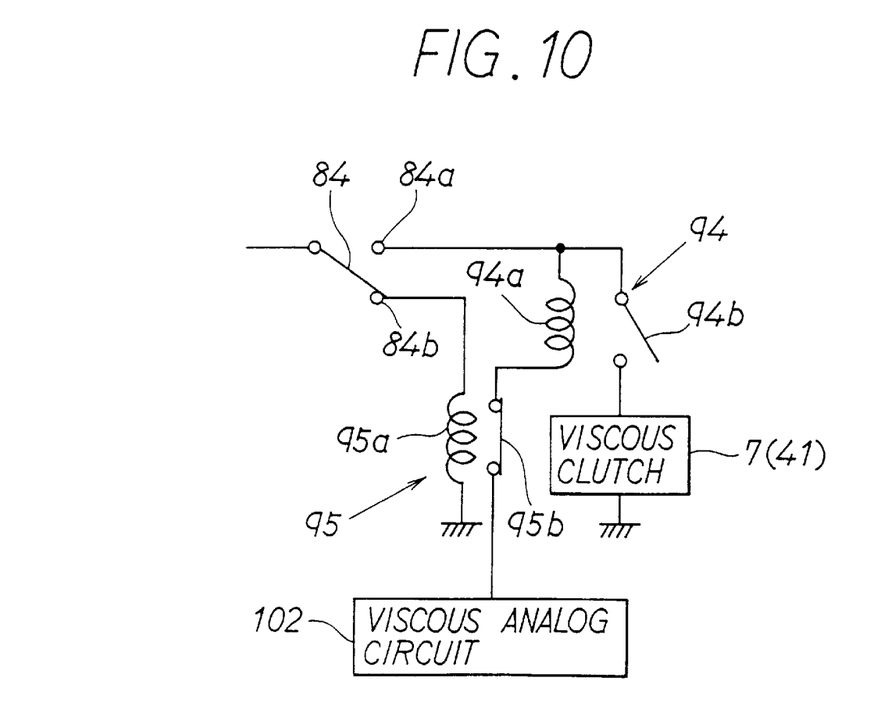
FIG. 10 is a block diagram showing an electric circuit of the air-conditioning apparatus for a vehicle according to a third preferred embodiment of the present invention.

A third preferred embodiment of the present invention will be described with reference to FIG. 10. FIG. 10 shows an electric circuit for an air-conditioning apparatus for a vehicle.

In the third embodiment, the electromagnetic coil 41 of the viscous clutch 7 is connected to a fixed contact 84a of the touch switch 84 through a viscous clutch relay 94. Further, the viscous analog circuit 102 is connected to a fixed contact 84b of the touch switch 84 through a stator relay 95. The viscous clutch relay 94 is composed of a relay coil 94a and a relay switch (normally open contact). Further, The stator relay 95 is composed of a relay coil 95a and a relay switch (normally close contact) 95b.

When the maximum heating operation is not necessary and the temperature control lever 85 is separated from the MAX HOT position, the touch switch 84 contacts the fixed contact 84b, and the relay coil 95a of the stator relay 95 is turned on to open the relay switch 95b. Since the relay coil 94a of the viscous clutch relay 94 is turned off, the relay switch 94b is opened so that the electromagnetic coil 41 of the viscous clutch 7 is turned off. Thus, because the viscous heater 9 is not operated when the maximum heating operation is not desired, the effects similar to those in the first embodiment can be obtained.

When the maximum heating operation is desired and the temperature control lever 85 is operated at the MAX HOT position, the touch switch 84 contacts the fixed contact 84a, and the relay coil 95a of the stator relay 95 is turned off to close the relay switch 95b. Since the relay coil 94a of the viscous clutch relay 94 is turned on, the relay switch 94b is closed so that the electromagnetic coil 41 of the viscous clutch 7 is turned on. Thus, because the viscous heater 9 is operated when the maximum heating operation is desired, the heating operation of the passenger compartment is performed with a large heating operation.

Although the present invention has been fully described in connection with preferred embodiments thereof with reference to the accompanying drawings, it is to be noted that various changes and modifications will become apparent to those skilled in the art.

For example, in the above-described embodiments, the belt transmitting mechanism 5 and the viscous clutch 7 are connected to and driven by the output shaft 11 of the engine E to rotate the shaft 8 of the viscous heater 9; however, the viscous clutch 7 may be directly connected to the output shaft 11 of the engine E to rotate the shaft 8 of the viscous heater 9. Further, a gear transmission having at least one stage gear or a V-belt type non-stage transmission may be connected between the output shaft 11 of the engine E and the viscous clutch 7 or between the viscous clutch 7 and the shaft 8 of the viscous heater 9.

The V-belt type non-stage transmission may be connected to the output shaft 11 of the engine E to drive the shaft 8 of the viscous heater 9, thereby eliminating the viscous clutch 7. In this case, a pulley ratio between an input pulley and an output pulley of the V-belt type non-stage transmission is optimized so that a load of the driving means such as the V-belt type non-stage transmission can be minimized while operating the viscous heater 9.

In each of the above-described embodiments, a water-cooled diesel engine is used as the engine E; however, the other water cooled engine such as a gasoline engine may be used.

In each of the above-described embodiments, the present invention is applied to an air-conditioning apparatus for a vehicle to perform a heating operation and a cooling operation for the passenger compartment; however, the present invention may be applied to an air-conditioning apparatus for a vehicle to perform only a heating operation for the passenger compartment.

In each of the above-described embodiments, the present invention is applied to the air-conditioning unit 2 using the air-mixing temperature control method; however, the present invention may be applied to an air-conditioning unit using a reheat type temperature control method for changing a flow of cooling water to be supplied to the front heater core 15 or for changing a temperature of the cooling water.

In each of the above-described embodiments, the cooling water temperature sensor 76 is used as means for detecting a physical amount relative to an oil temperature of viscous fluid in the heat-generating chamber 50; however the oil temperature sensor 77 may be used as the physical amount detection means. Further, there may be used means for detecting a temperature of the separator 52 of the viscous heater 9. Still further, there may be used means for detecting a temperature of air blown from a duct.

In each of the above-described embodiments, the cooling water temperature sensor 76 is used to detect a temperature of the cooling water in an outlet side cooling water pipe 57b of the cooling water passage 51 of the viscous heater 9; however, a cooling water temperature sensor or a cooling water temperature switch for detecting a temperature of the cooling water at an inlet side of the front heater core 15 or the rear heater core 16 may be used. Further, a cooling water temperature sensor or a cooling water temperature switch for detecting a temperature of the cooling water at an outlet side of the engine E may be used.

In the first embodiment, control signal detection means for detecting a control signal outputting to damper driving means such as servomotor 29 driving the air-mixing damper 28 may be formed in the air-conditioning ECU. Therefore, the electromagnetic coil 41 of the viscous clutch 7 may be turned on at the only time where the control signal outputting to the damper driving means corresponds to the maximum heating operation.

In the second embodiment, it may be determined that the maximum heating operation is desired when a tension of the wire cable 88 is detected in this case where the temperature control lever 85 is operated at the MAX HOT position. Further, it may be determined that the maximum heating operation is desired when the lever position of the temperature control lever 85 is placed at the MAX HOT side more than 90%.

Such changes and modifications are to be understood as being within the scope of the present invention as defined by the appended claims.

What is claimed is:

1. A heating apparatus for heating a passenger compartment of a vehicle having a water-cooled engine, comprising:
    a duct for blowing air into said passenger compartment;
    a heating heat exchanger disposed in said duct, for heating said passenger compartment by heat-exchange between cooling water having cooled said water-cooled engine and air to be blown into said passenger compartment;
    a heat-generating unit using a shearing force, said heat-generating unit including a rotor which rotates when a driving force is applied thereto and a heat-generating chamber for sealing therein viscous fluid which generates heat for heating said cooling water to be supplied to said heating heat exchanger when a shearing force generated by a rotational force of said rotor is applied to said viscous fluid;
    a driving force transmission unit for transmitting a driving force of said engine to said rotor;
    a heating control unit for controlling said driving force transmission unit in such a manner that said heat-generating unit is operated only when a heating operation of said passenger compartment is the maximum heating operation or the maximum heating operation for said passenger compartment is desired;
    an air-mixing damper for adjusting a ratio between an amount of air passing through said heating exchanger and an amount of air bypassing said heating heat exchanger.
    wherein said heating control unit includes:
        temperature setting means for setting a temperature of said passenger compartment to a desired value;
        environmental condition detecting means for detecting an environmental condition having an influence on the heating operation;
        target air temperature calculating means for calculating a target temperature of air to be blown into said passenger compartment through said duct based on at least a set temperature set by said temperature setting means and an environmental condition detected by said environmental condition detecting means; and
        damper opening calculating means for calculating a target damper opening degree of air-mixing damper based on a target air temperature calculated by said target air temperature calculating means,
    wherein said heating control unit operates said heat-generating unit only when said target damper opening degree calculated by said damper opening calculating means corresponds to the maximum heating operation.

2. A heating apparatus according to claim 1, wherein said driving force transmission unit includes:
    a belt transmission unit connected to and driving by an output shaft of said engine, and
    a clutch connected to said belt transmission unit, for engaging and releasing between said belt transmission unit and said rotor.

3. A heating apparatus for heating a passenger compartment of a vehicle having a water-cooled engine, comprising:
    a duct for blowing air into said passenger compartment;
    a heating heat exchanger disposed in said duct, for heating said passenger compartment by heat-exchange between cooling water having cooled said water-cooled engine and air to be blown into said passenger compartment;
    a heat-generating unit using a shearing force, said heat-generating unit including a rotor which rotates when a driving force is applied thereto and a heat-generating chamber for sealing therein viscous fluid which generates heat for heating said cooling water to be supplied to said heating heat exchanger when a shearing force generated by a rotational force of said rotor is applied to said viscous fluid;
    a driving force transmission unit for transmitting a driving force of said engine to said rotor;
    a heating control unit for controlling said driving force transmission unit in such a manner that said heat-generating unit is operated only when a heating operation of said passenger compartment is the maximum heating operation or the maximum heating operation for said passenger compartment is desired;
    said heating control unit including viscous fluid temperature physical amount detecting means for detecting a physical amount relative to a temperature of said viscous fluid in said heat-generating chamber;
    said heating control unit operates said heat-generating unit when said physical amount detected by said viscous fluid temperature physical amount detecting means if lower than a set value;
    said heating control unit stops an operation of said heat-generating unit when said physical amount detected by said viscous fluid temperature physical amount detecting means exceeds said set valve;
    an air-mixing damper for adjusting a ratio between an amount of air passing through said heating heat exchanger and an amount of air bypassing said heating heat exchanger,
    wherein said heating control unit includes:
        temperature setting means for setting a temperature of said passenger compartment to a desired value;
        environmental condition detecting means for detecting an environmental condition having an influence on the heating operation;
        target air temperature calculating means for calculating a target temperature of air to be blown into said passenger compartment through said duct based on at least a set temperature set by said temperature setting means and an environmental condition detected by said environmental condition detecting means; and damper opening calculating means for calculating a target damper opening degree of said air-mixing damper based on a target air temperature calculated by said target air temperature calculating means, wherein said heating control unit operates said heat-generating unit only when said target damper opening degree calculated by said damper opening calculating means corresponds to the maximum heating operation.

4. A heating apparatus according to claim 3, wherein said driving force transmission unit includes:

a belt transmission unit connected to and driving by an output shaft of said engine, and a clutch connected to said belt transmission unit and said rotor.

5. A heating apparatus according to claim 3, wherein said viscous fluid temperature physical amount detecting mean is cooling water temperature detecting means for detecting a temperature of said cooling water to be supplied to said heating heat exchanger.

* * * * *